V. H. TODD.
METHOD OF CALIBRATING ELECTRIC CURRENT METERS.
APPLICATION FILED MAR. 4, 1914.
1,182,818.
Patented May 9, 1916.
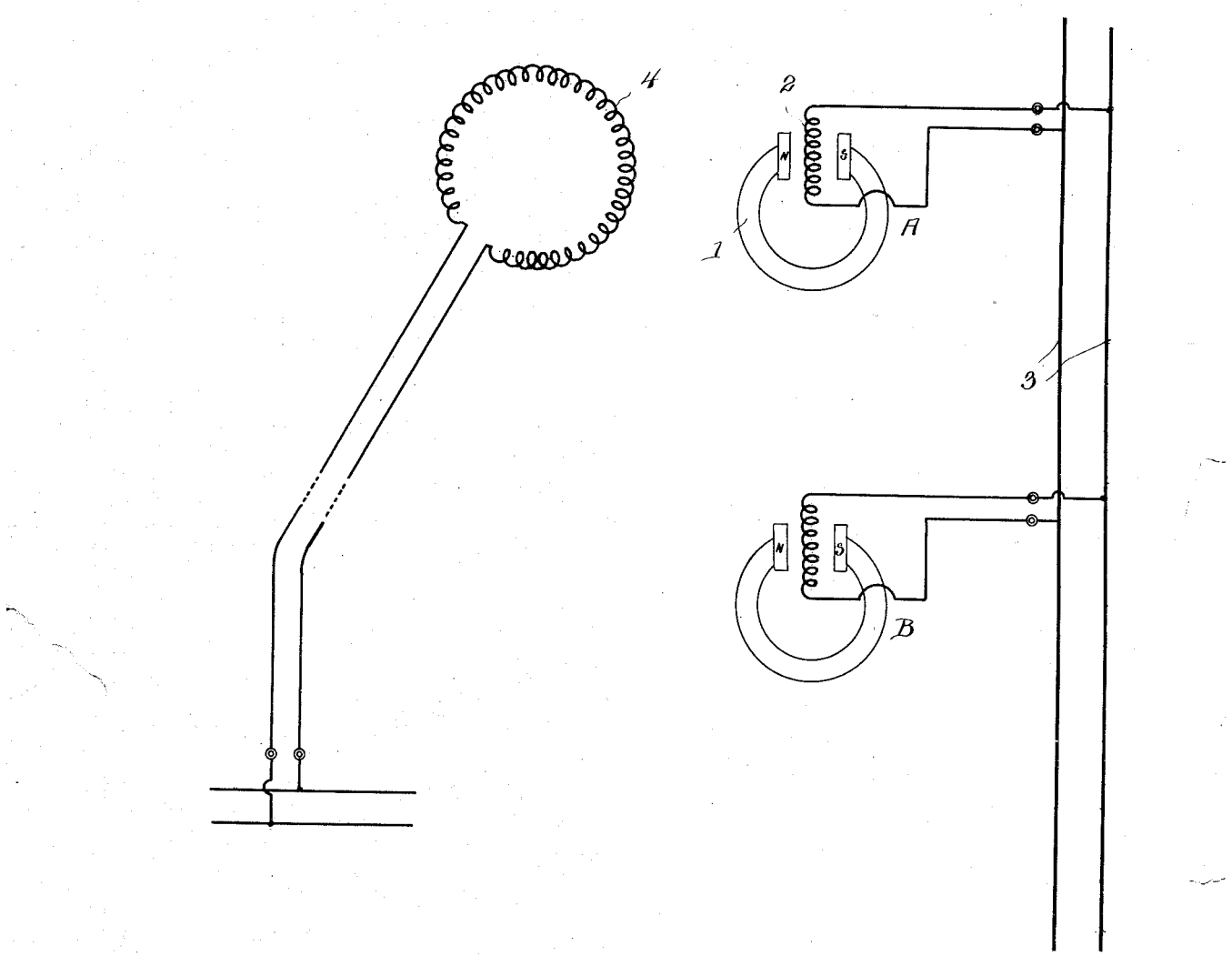
Witnesses
W. P. Smith
John J. McCarthy
Inventor
Victor H. Todd.
By Victor J. Evans
Attorney

UNITED STATES PATENT OFFICE.

VICTOR H. TODD, OF ORANGE, NEW JERSEY, ASSIGNOR OF ONE-HALF TO WILLIAM F. MEHRING, OF ALLENTOWN, PENNSYLVANIA.

METHOD OF CALIBRATING ELECTRIC-CURRENT METERS.

1,182,818. Specification of Letters Patent. Patented May 9, 1916.

Application filed March 4, 1914. Serial No. 822,501.

*To all whom it may concern:*

Be it known that I, VICTOR H. TODD, a citizen of the United States residing at Orange, in the county of Essex and State of New Jersey, have invented new and useful Improvements in Methods of Calibrating Electric-Current Meters, of which the following is a specification.

This invention relates to improvements in methods of calibrating electric current meters and has particular application to a method whereby direct current meters employing a permanent magnet and a movable coil under the influence of such magnet may be calibrated.

In carrying out the present invention it is my purpose to provide a method of calibrating electric current meters employing a permanent magnet and a movable coil under the influence thereof, whereby the strength of the permanent magnet of the meter to be calibrated is lessened succeeding the connecting of the meter in the line, the strength of the magnet being influenced until the meter corresponds with a standard or calibrated meter connected in the line.

With the above and other objects in view the invention consists in the various steps set forth in and falling within the scope of the appended claims.

In the accompanying drawing the figure is a diagrammatic view illustrating an apparatus whereby my method may be carried into practice.

My method is particularly adapted for the purpose of calibrating direct current meters of that type employing a permanent magnet and a movable coil under the influence of such magnet and consists in connecting the meter to be calibrated and a standard meter in multiple with a source of current and then subjecting the permanent magnet of the unknown meter to a counter-flux produced by an alternating current until the unknown meter corresponds with the standard instrument. When this occurs the permanent magnet of the meter being calibrated is relieved of the influence of the counter-acting field or flux.

Referring now to the drawing in detail A designates a direct current meter embodying, among other features, a permanent magnet 1 and a coil 2 disposed between the poles of the magnet 1 and under the influence of the field or flux set up by the latter.

B designates a standard meter and the standard meter and meter to be calibrated are connected in multiple or parallel with an electric circuit 3 connected up with the suitable source of current.

4 designates a coil of wire wrapped in such manner as to produce a magnetic flux adapted, when the coil is disposed in proximity to the permanent magnet 1 of the unknown meter, to act in opposition to the field set up by such magnet thereby lessening the effect of the field of the magnet on the movable coil 2. This calibrating coil, as the coil may be termed, is connected in circuit with a suitable source of alternating current so that the coil may be energized.

In practice the meters A and B are connected in circuit as illustrated in the drawing and the circuit 3 closed. As usual, the flux, springs, resistance, etc., of the meter to be calibrated are so proportioned that the hand or finger of the instrument indicates more amperage or voltage as the case may be than it should. The circuit of the calibrating coil is now closed and such coil moved slowly into proximity to the permanent magnet 1 of the meter to be calibrated. As the calibrater coil approaches the magnet 1 the field set up by the latter is gradually weakened and the hand or finger of the meter A drops back slowly to a position of the hand corresponding to that of the meter B. When the hand of the meter A reaches a proper position the calibrating coil is removed and the face or dial of the meter A calibrated in the usual well known manner.

From the foregoing description taken in connection with the accompanying drawing the manner of carrying out my improved method will be readily apparent to those skilled in the art to which the invention appertains.

I claim:—

1. The method of calibrating electric current meters employing a permanent magnet and a movable coil under the influence of the magnet, which consists in connecting the meter to be calibrated and a standard meter in multiple with an electric circuit and then subjecting the permanent magnet of the meter to be calibrated to a field produced by an alternating current until the unknown meter corresponds with the standard instrument.

2. The method of calibrating electric current meters employing a permanent magnet and a movable coil under the influence of the magnet, which consists in connecting the meter to be calibrated and a standard meter in multiple with an electric circuit and then carrying an alternating current coil producing a magnetic flux into proximity to the magnet of the unknown meter and moving the coil gradually toward the magnet until the unknown meter corresponds with the standard instrument.

In testimony whereof I affix my signature in presence of two witnesses.

VICTOR H. TODD.

Witnesses:
WILLIAM F. MEHRING,
EMILIE F. H. FITCH.